(12) United States Patent
Harper et al.

(10) Patent No.: US 11,497,192 B2
(45) Date of Patent: Nov. 15, 2022

(54) FEEDER

(71) Applicant: Doskocil Manufacturing Company, Inc., Arlington, TX (US)

(72) Inventors: Michael D. Harper, Fort Worth, TX (US); Ryan Paxson, Elk Rapids, MI (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 72 days.

(21) Appl. No.: 17/028,053

(22) Filed: Sep. 22, 2020

(65) Prior Publication Data
US 2021/0137070 A1 May 13, 2021

Related U.S. Application Data

(60) Provisional application No. 62/933,728, filed on Nov. 11, 2019.

(51) Int. Cl.
*A01K 5/01* (2006.01)
*A01K 7/00* (2006.01)

(52) U.S. Cl.
CPC .............. *A01K 5/01* (2013.01); *A01K 7/005* (2013.01)

(58) Field of Classification Search
CPC ......... A01K 5/01; A01K 5/0114; A01K 7/005
See application file for complete search history.

(56) References Cited

U.S. PATENT DOCUMENTS

| 6,983,862 | B2 * | 1/2006 | Nottingham | B67D 1/16 |
| | | | | 222/109 |
| 2018/0014504 | A1 * | 1/2018 | Grinnell | A01K 5/01 |
| 2019/0000038 | A1 * | 1/2019 | Whitney | A01K 7/00 |

* cited by examiner

*Primary Examiner* — Joshua E Rodden
*Assistant Examiner* — Henry Hooper Mudd
(74) *Attorney, Agent, or Firm* — Global IP Counselors, LLP

(57) ABSTRACT

A feeder includes a base portion defining an internal storage chamber and having at least one opening, a tubular insert configured to be positioned within the opening and attachable to the base portion, the insert including a sealing system and defining a through passage, the sealing system configured to seal the internal storage chamber, a lid configured to attach to the insert so to prevent passage through the through passage, and a bowl configured to be disposed within the insert.

13 Claims, 10 Drawing Sheets

FEEDER

CROSS-REFERENCE TO RELATED APPLICATION

This application claims priority to U.S. Provisional Patent Application No. 62/933,728 filed Nov. 11, 2019, the contents of which are hereby incorporated herein by reference.

BACKGROUND

Field of the Invention

The present invention relates to a feeder. In particular, the present invention a raised animal feeder that has an internal storage area.

Background Information

Conventional raised feeders can provide extra large elevated dog bowls that are suitable for large dog breeds & older pets. These feeders prevent pets from straining or bending their necks while eating or drinking, and include raised bowl rims prevent spillage. These feeders can be formed from BPA-free plastic that provides strong support. Stainless steel water & food bowls dishwasher-safe can be.

Conventional feeders can also be designed for efficient shipping, since they have a stackable design, that can enable easily stacking one on the other to achieve minimal carton space. These feeders can also include molded in recesses for two bowls, molded in handles, removable stainless bowls, non-spill, molded in edge on and molded in detents for easy bowl removal.

SUMMARY

In view of the state of the known technology, one aspect of the present disclosure is to provide an improved feeder that can store food and maintain the food in a fresh condition, while simultaneously prevent pets from straining or bending their necks while eating or drinking. These and other aspects are achieved by a feeder comprising a base portion defining an internal storage chamber and having at least one opening, a tubular insert configured to be positioned within the opening and attachable to the base portion, the insert including a sealing system and defining a through passage, the sealing system configured to seal the internal storage chamber, a lid configured to attach to the insert so to prevent passage through the through passage, and a bowl configured to be disposed within the insert.

Another aspect of the invention is provided by feeder comprising a base portion defining an internal storage chamber and having a first opening and a second opening, a first tubular insert configured to be positioned within the first opening and attachable to the base portion, the first tubular insert defining a through passage, a first sealing system configured to be disposed between a surface of the first tubular insert and a surface of the base adjacent the first opening in the base to seal the internal storage chamber, a lid configured to attach to the first tubular insert so to prevent passage through the through passage, a bowl configured to be disposed within the first tubular insert, a second tubular insert configured to be disposed in the second opening, the second tubular insert having a sidewall and a bottom wall, such that the bottom wall prevents access into the base when the second insert is disposed within the second opening, and a second sealing system configured to be disposed between a surface of the second tubular insert and the surface of the base adjacent the second opening in the base to seal the internal storage chamber.

Embodiments of present invention improve the existing raised feeders, since the feeder can be raised feeder and provide storage. Further, the embodiments described herein enable an airtight seal for a storage compartment, control moisture balance, are pest proof and keep the food safe.

BRIEF DESCRIPTION OF THE DRAWINGS

The invention will be explained in more detail hereinafter with reference to the drawings.

DETAILED DESCRIPTION OF THE EMBODIMENTS

Figure 1:
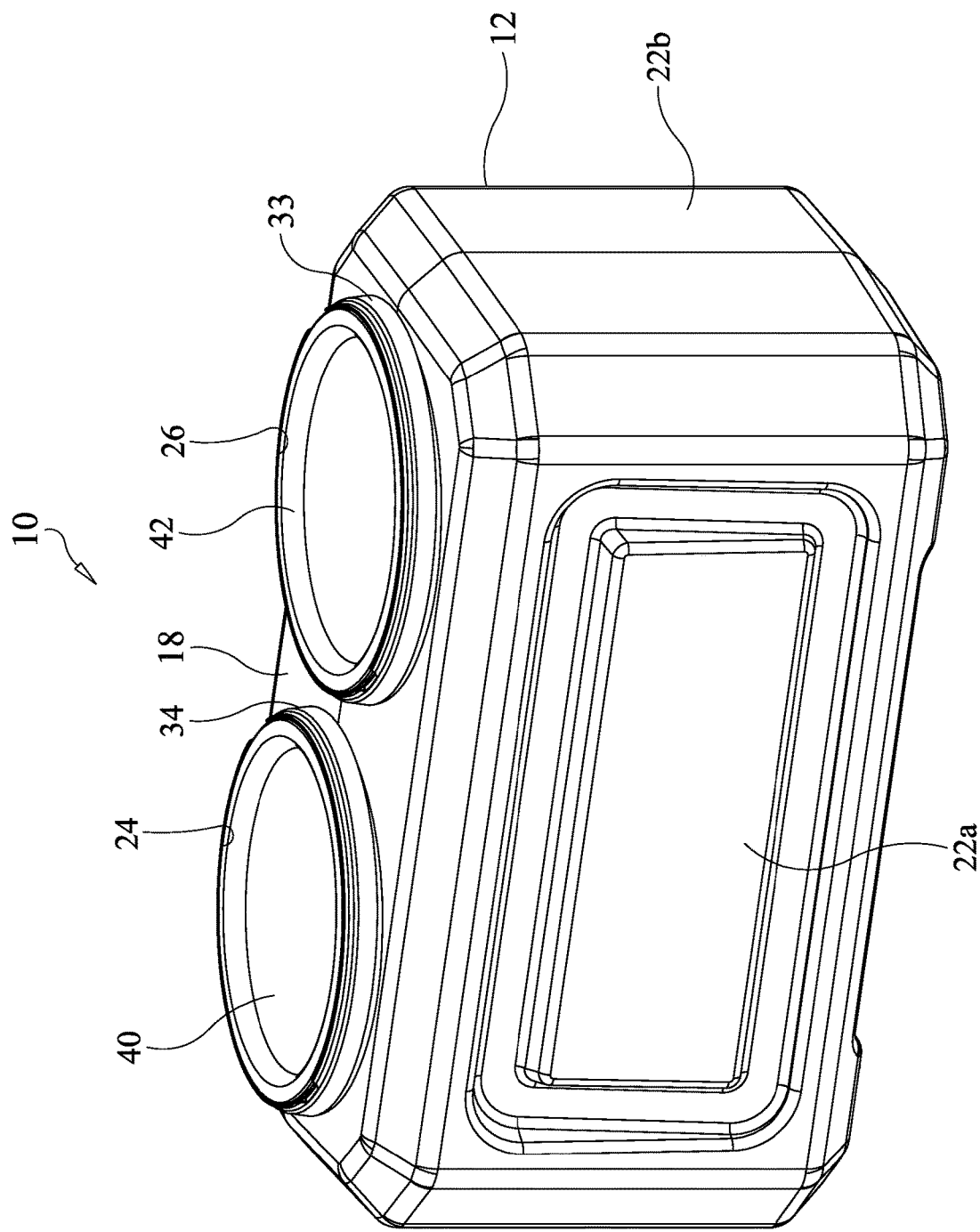
FIG. 1 is a top perspective view of a feeder according to an embodiment of the present invention.
Figure 2:
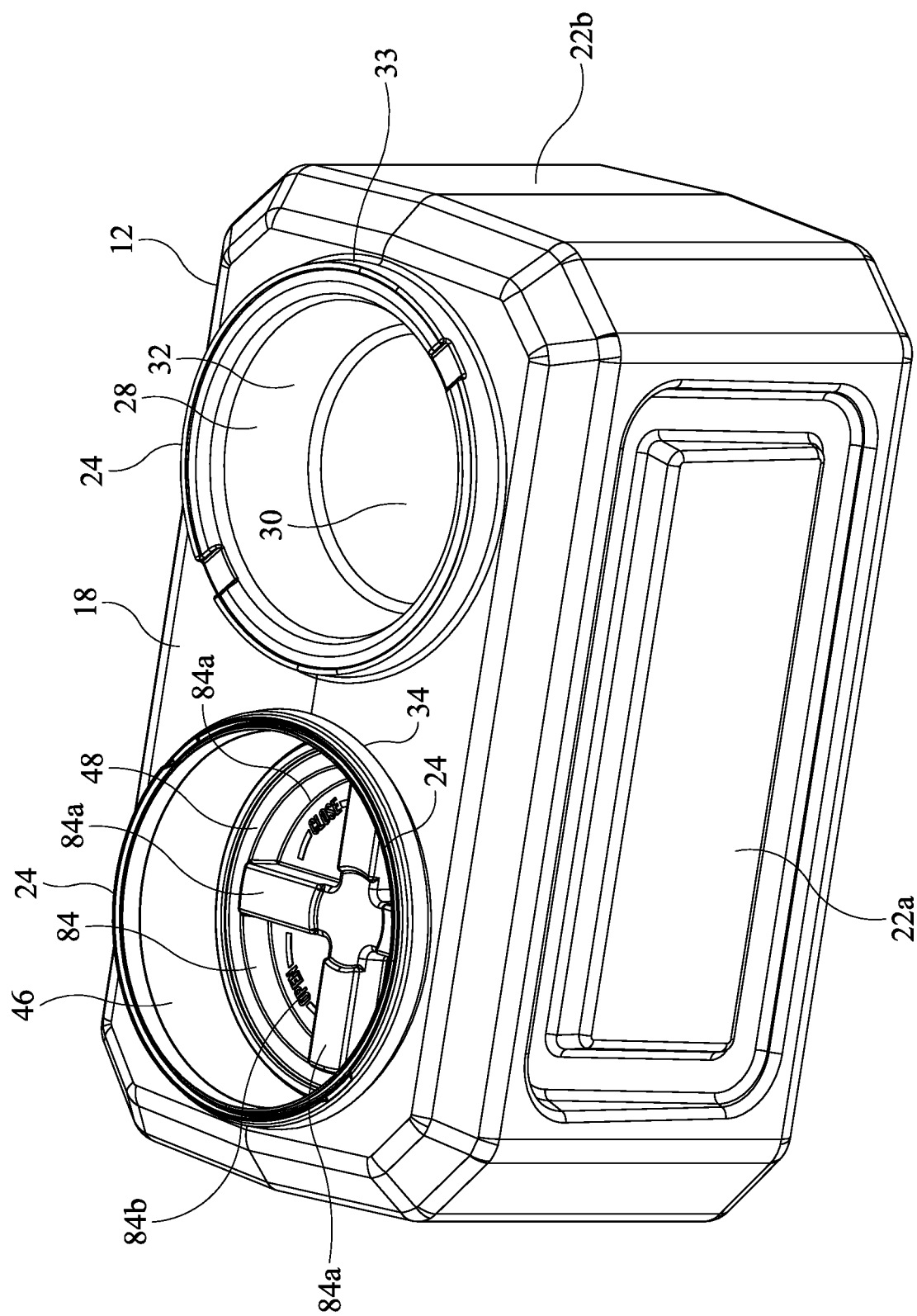
FIG. 2 is a top perspective view of the feeder shown in FIG. 1.
Figure 3:
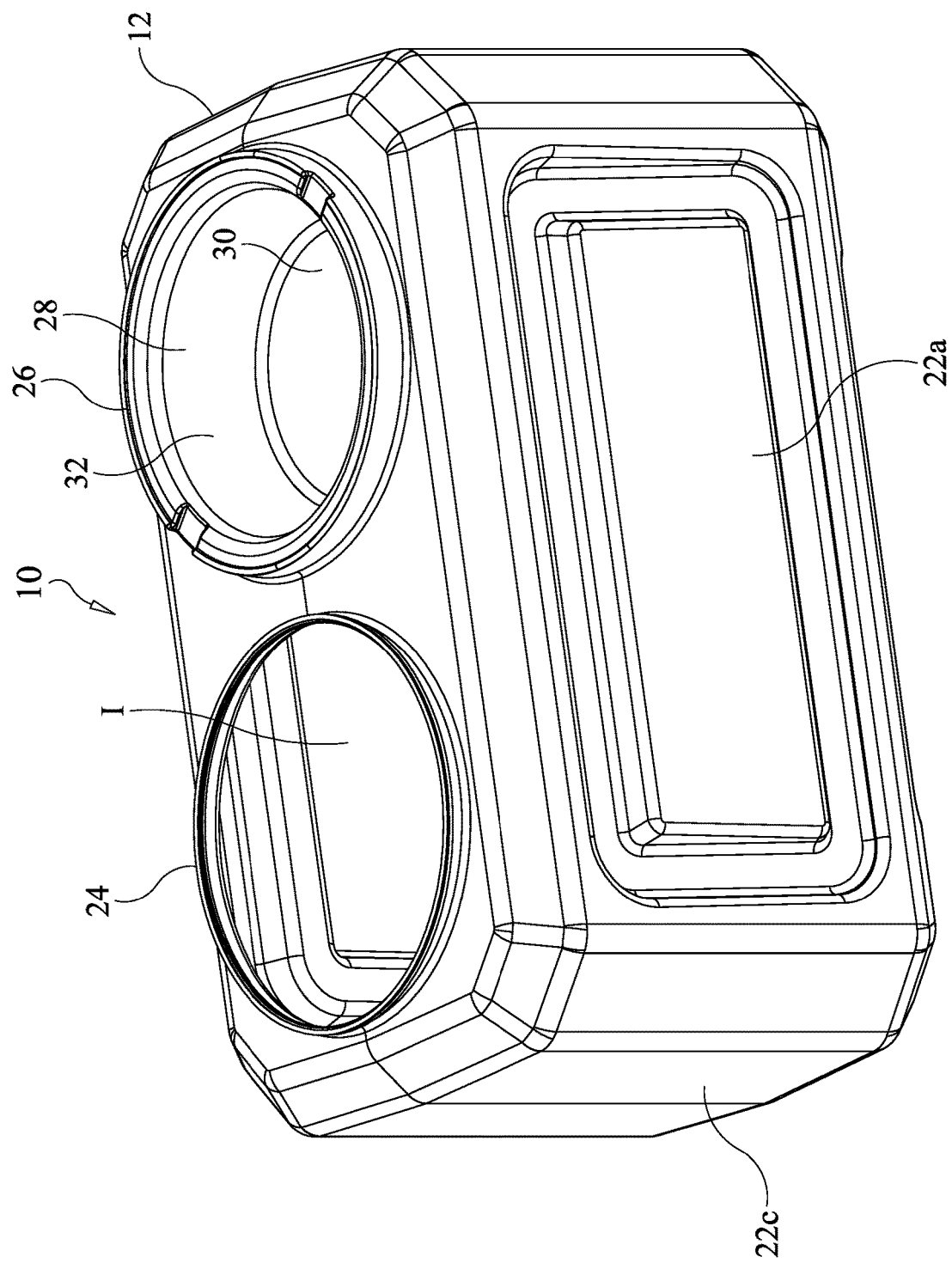
FIG. 3 is a top perspective view of the feeder shown in FIG. 1 with the insert and lid removed from one of the openings.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-4, a feeder 10 is illustrated in accordance with an embodiment. In this embodiment, the feeder 10 is a raised feeder having a body portion 12 that defines an internal storage compartment I for food or other materials and/or liquids, and a two bowl feeding system 12 (e.g., a first bowl system 14 and a second bowl system 16).

The body portion 12 is generally rectangular and defines the internal storage compartment I. The body portion 12 can be a plastic molded piece that is a unitary one piece member that has a top surface 18, a bottom surface 20 and four side surfaces 22a-d that collectively bound the internal storage compartment I. Alternatively, the body portion 12 can be molded in multiple pieces that are attached after or during the molding process. It is noted that body portion 12 can be formed in any manner desired and is not necessarily limited to a molded structure.

The top surface 18 of the body portion 12 preferably has a first circular opening 24 and a second circular opening 26 that are approximately the same size and configuration (e.g., have about the same diameters). However, it is noted that the body portion 12 can have any number of openings in any confirmation and in any of the sides or surfaces or in any combination thereof. Moreover, when the body portion 12 has a plurality of openings, the openings can be of the same or different size and/or configuration. Based on the size of the body portion 12, the internal storage compartment I generally has capacity up to 40 pounds or more of food, but depending on the desired size of the feeder 10, the capacity of the internal storage compartment I can be as large or as small as desired.

The first opening 24 in the top surface 18 of the body portion 12 is configured to enable access through the top surface 18 and into internal storage compartment I. Thus, the opening 24 can be used to deposit food, water and/or any other item or substances therein.

The second opening 26 preferably is defined by an upwardly extending protrusion 33. The protrusion 33 extends upwardly from the top surface 18 and is generally perpendicular to the top surface 18. The opening 24 includes a molded recess 28 with a bottom surface 30. In other words, as shown in FIGS. 1-3 and 6, a generally conical wall 32 extends from the opening 26 at the top surface 18 into the internal storage compartment I. the conical wall 32 tapers radially inwardly relatively to the opening 26 and connects to the bottom surface 30 to form the recess 28. The bottom surface 30 is generally parallel to the top surface 18. Further, as can be understood, the recess 28 can be molded simultaneously with the remainder of the body portion 12 or the recess 28 can be added to the opening 24 at a later time. In such an embodiment, the recess 28 can attach to the body portion 12 in any manner desired.

Figure 7:
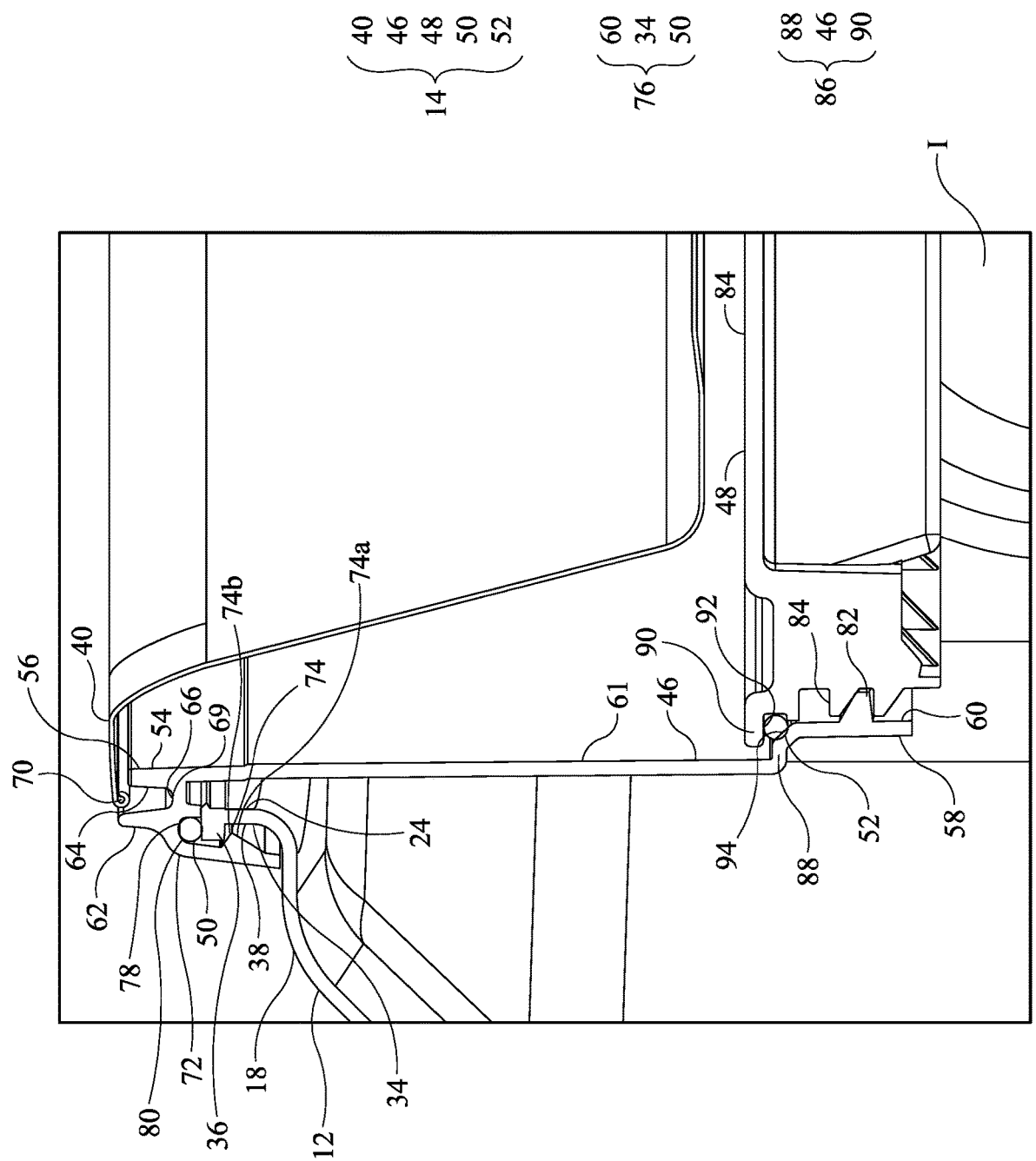
FIG. 7 is an enlarged view of the insert in the feeder shown in FIG. 1.

The opening 24 is defined by an upwardly extending protrusion 34. That is, as shown in FIG. 7, the protrusion 34 extends upwardly from the top surface 18 and is generally perpendicular to the top surface 18. A lip 36 extends radially outwardly from the outer surface 38 of the protrusion 34 and is configured to connect to the first bowl system 14 when the first bowl system 14 is disposed within or accepted by the opening 24.

Thus, in this embodiment, a first bowl 40 is disposed in in the first bowl system 14 and a second bowl 42 is disposed in the second bowl system 16. The bowls 40, 42 can be merely positioned in the first and second bowl systems 14, 16 or the bowls 40, 42 can be connected to the bowl systems 14, 16. The edges of the openings 24,26 can have a small depression 44 to enable the user easier access to removing the bowls 40, 42. The bowls 40, 42 can be stainless steel or any other suitable material, and are disposed within the top surface of the body portion.

Figure 4:
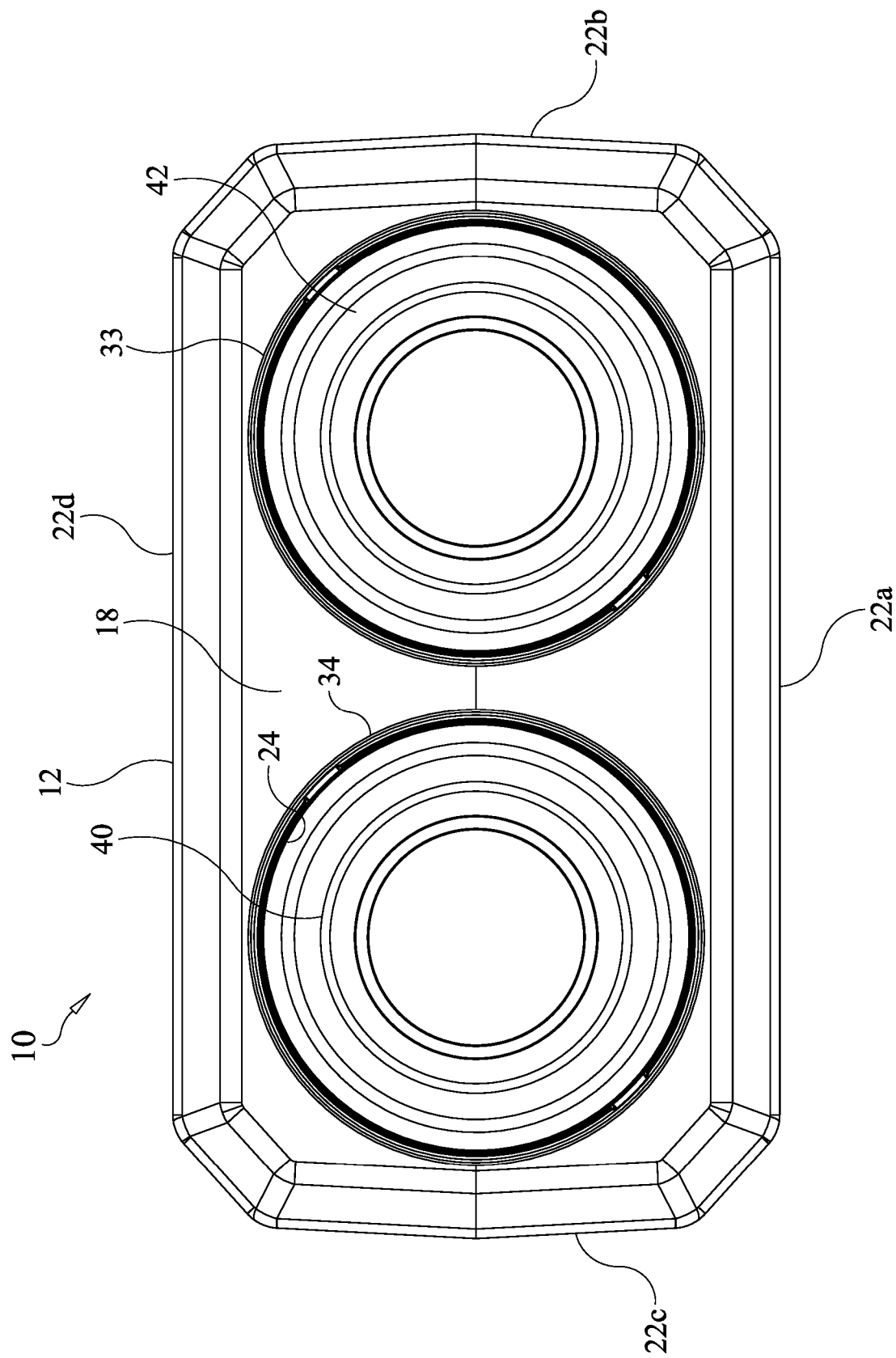
FIG. 4 is an exploded view of the feeder shown in FIG. 1.
Figure 6:
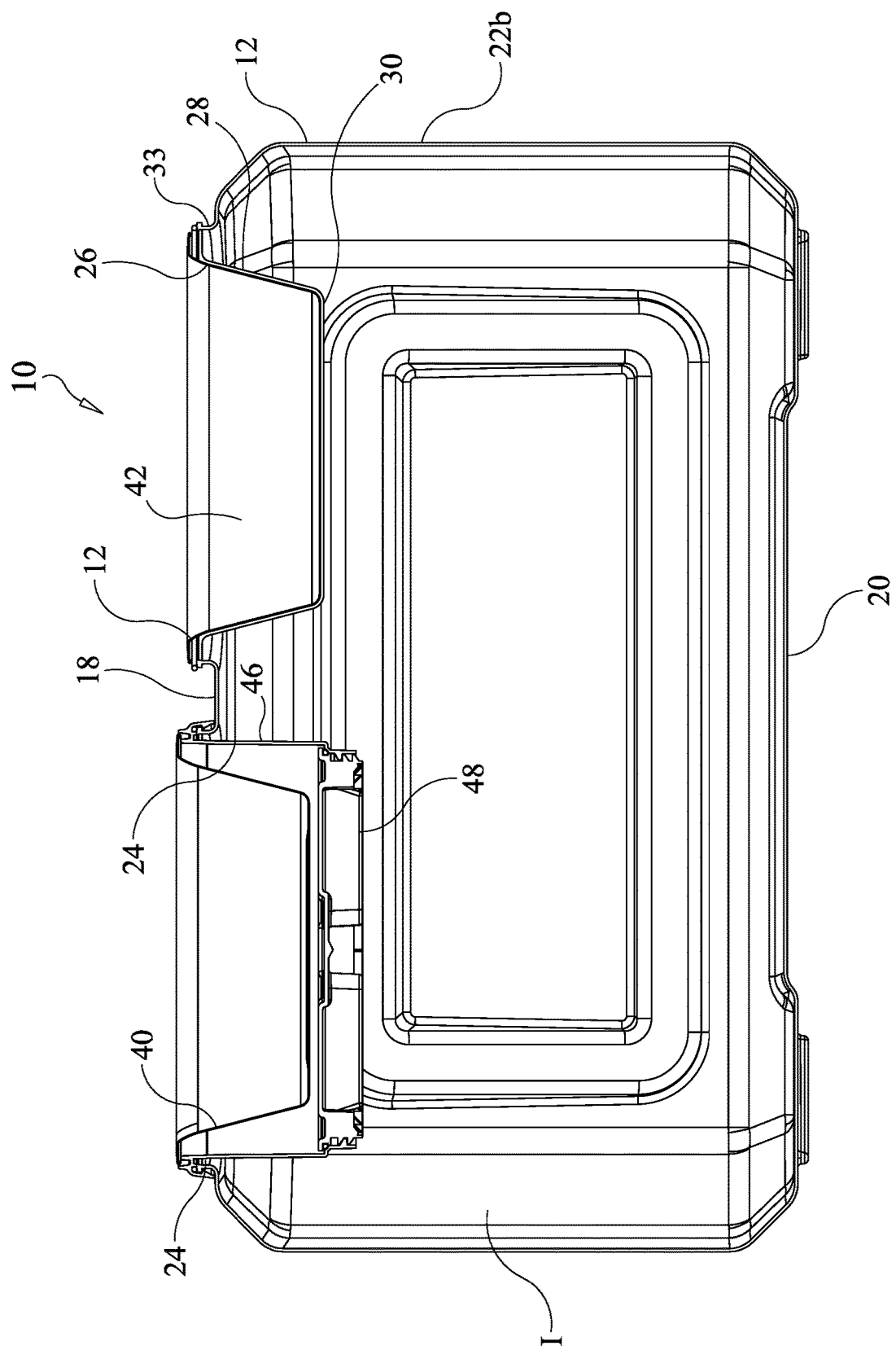
FIG. 6 is side view in section taken along lines 6-6 in FIG. 5.

As shown in FIGS. 4, 6 and 7, the first bowl system 14 includes the bowl 40, a sleeve 46, a lid 48, a first sealing device 50 and a second sealing device 52. The sleeve 46 is preferable a molded plastic generally cylindrical sleeve that is sized and configured to be disposed within the first opening 24.

The sleeve 46 has a top portion 54 with a first opening 56, a bottom portion 58 with a second opening 60, and a cylindrical wall 61 that extends between the top portion 54 and the bottom portion 58. Thus, the sleeve 46 forms a tubular passage that is open at both ends. The top portion 54 includes a radial protrusion 62 that extends outwardly from the outer surface 64. The radial protrusion 62 includes a recess 66 in an upper surface 68 that is sized and configured to accept a rim 70 of the bowl 40 and a downwardly extending extension 72 that is configured to snap fit with the lip 36. Extension 72 has a inwardly extending protrusion 74 that has a tapered first surface 74a and a second surface 74b. Thus, when the sleeve 46 is being attached to the protrusion 34 the first surface 74a abuts the protrusion 34 forcing the extension 72 outwardly. When the protrusion 74 passes the lower portion of the protrusion 34, the extension 72 snaps radially inwardly, since the extension 72 has elastic properties. The protrusion 74 thus snaps underneath the protrusion 34 and the sleeve 46 is securely held to the protrusion 34 at surface 74b. It is noted that this connection is merely one embodiment, and the sleeve 46 can connect to, be held on or simply be disposed on the protrusion 34.

Furthermore, in one embodiment, the first bowl system 14 includes a first sealing system 76 that is comprised of the radial protrusion 60, the protrusion 34 and the first sealing device 50. Thus, as shown in FIG. 7, the radial protrusion 60 includes a radial groove 78 in a bottom surface 80. The sealing device 50 (e.g., a O-ring) is disposed within the groove 78. When the radial protrusion 60 is snap fit to the protrusion 34 the O-ring (sealing device 50) is compressed between the bottom surface 80 of the groove 78 and the lip 36 of the protrusion 34. As can be understood, the O-ring can be rubber or any other resilient compressible material that forms a seal between the sleeve 46 and the body portion 12. Moreover, the sealing device 50 can have any structure (e.g., oval, circular, rectangular or any other polygon) that is suitable to seal between the bottom surface 80 of the groove 78 and the lip 36 of the protrusion 34.

The bottom portion 58 of the sleeve 46 an include threads thereon 82. The threads 82 are configured to accept with and mate with the threads 84 on the lid. As illustrated in FIG. 7, the bottom portion 58, in one embodiment can have a diameter that is slightly smaller or less than the diameter of the top portion 54 of the sleeve 46. Thus, the sealing device 52 and the opening 60 can have a smaller diameter than the sealing device 50 and the opening 56.

The lid 48 is preferable a circular structure that is molded from the same material as the body portion 12. The lid 48 preferably has a diameter that is about the same diameter as the bottom portion 58 of the sleeve 46, and has threads 84 thereon. The upper surface 84 of the lid 46 can have an X-configuration (see for example, FIG. 5) formed from complimentary raised portion 84a and recessed portions 84b. This X-configuration enables a user to grip and rotate (see arrow A) the lid 48 so as to screw (or unscrew) the lid 48 in to the sleeve 46 such that the threads 84 on the lid 48 engage and mate with the threads 82 on the sleeve 46.

In one embodiment, the first bowl system 14 includes a second sealing system 86 that is comprised of a lip 88 on the sleeve 46, a radial protrusion 90 on the lid 48 and the second sealing device 52. The lip 88 on the sleeve 46 is formed from the reduction in diameter at the bottom portion 58 and the radial protrusion 90 on the lid 48 extends radially outwardly from the top surface 84 of the lid 48. Thus, when connecting the lid 48 to the sleeve 46, the second sealing device 52 (e.g., an O-ring) can be disposed between the bottom surface 92 of the radial protrusion 90 and a surface 94 of the lip 88. When the lid 48 is attached to the sleeve 46, the O-ring (the second sealing device 52) is compressed between the surface 92 of the protrusion 90 and the surface 94 of the lip 88. Accordingly, the lid 48 can be attached to the sleeve 46, with the second O-ring providing a seal between the lid 48 and the sleeve 46. It is noted that the lid 48 can be coupled to the sleeve 46 in any suitable manner, e.g., threads, snap-fit, etc. As can be understood, the O-ring can be rubber or any other resilient compressible material that forms a seal between the sleeve 46 and the lid 48. Moreover, the sealing device 52 can have any structure (e.g., oval, circular, rectangular or any other polygon) that is suitable to seal between the lid 48 and the sleeve 46.

The second O-ring (the second sealing device 52) can be smaller than the first O-ring (the first sealing device 50) and can be disposed at a bottom edge of the sleeve 46.

Figure 5:
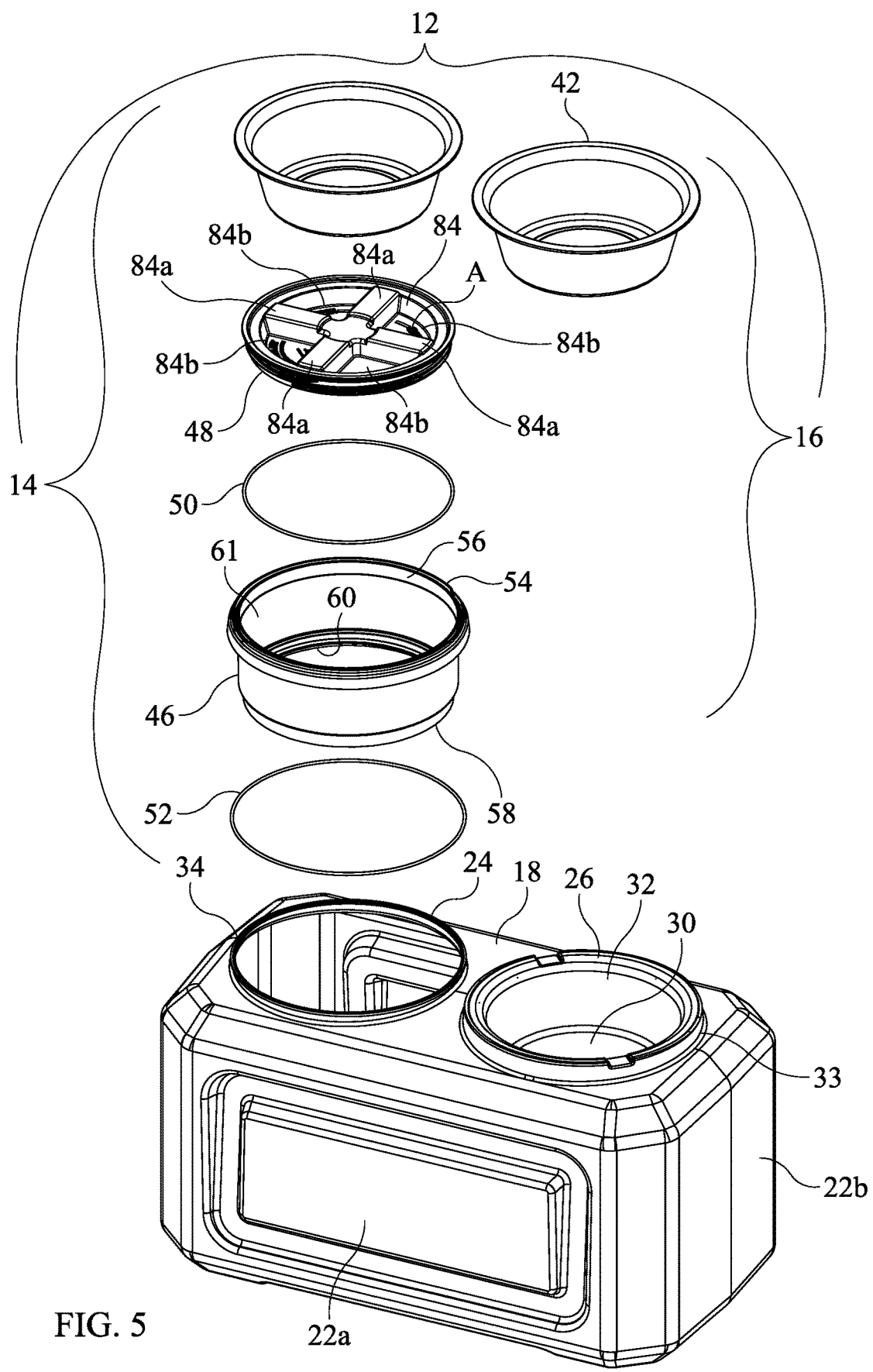
FIG. 5 is a top view of the feeder shown in FIG. 1.

The method of assembly can be as follows. As shown in FIGS. 5-7, the sleeve 46 can be inserted into the opening 24. When inserting the sleeve 46 in to the opening 24, the second sealing device 50 can be positioned between the sleeve 46 and the lip 36 of the protrusion 34. The sleeve 46 can be snap fit to the protrusion using with the downwardly extending extension 72, as discussed above. The radial protrusion 60, the protrusion 34 and the first sealing device 50 form the first sealing system 76 that seals the exterior of the sleeve 46 from the internal storage compartment I.

The lid 48 is then attached to the bottom 28 of the sleeve 46 using the threads 82, 84. As discussed above, the second sealing device 52 can be disposed between the radial protrusion 90 on the lid 48 and the lip 88 on the sleeve 46. The lip 88 on the sleeve 46, the radial protrusion 90 on the lid 48 and the second sealing device 52 form the second sealing system 86 that seals the exterior of the sleeve 46 from the internal storage compartment I.

Bowl 40 can then be placed in the interior portion of the sleeve 46, as specifically illustrated in FIG. 6. Additionally, bowl 42 can be discussed within recess 30. When desired, the lid 48 can be removed and additional food can be retrieved from the internal storage compartment I to be placed in one or both of the bowls 40, 42.

Figure 8:
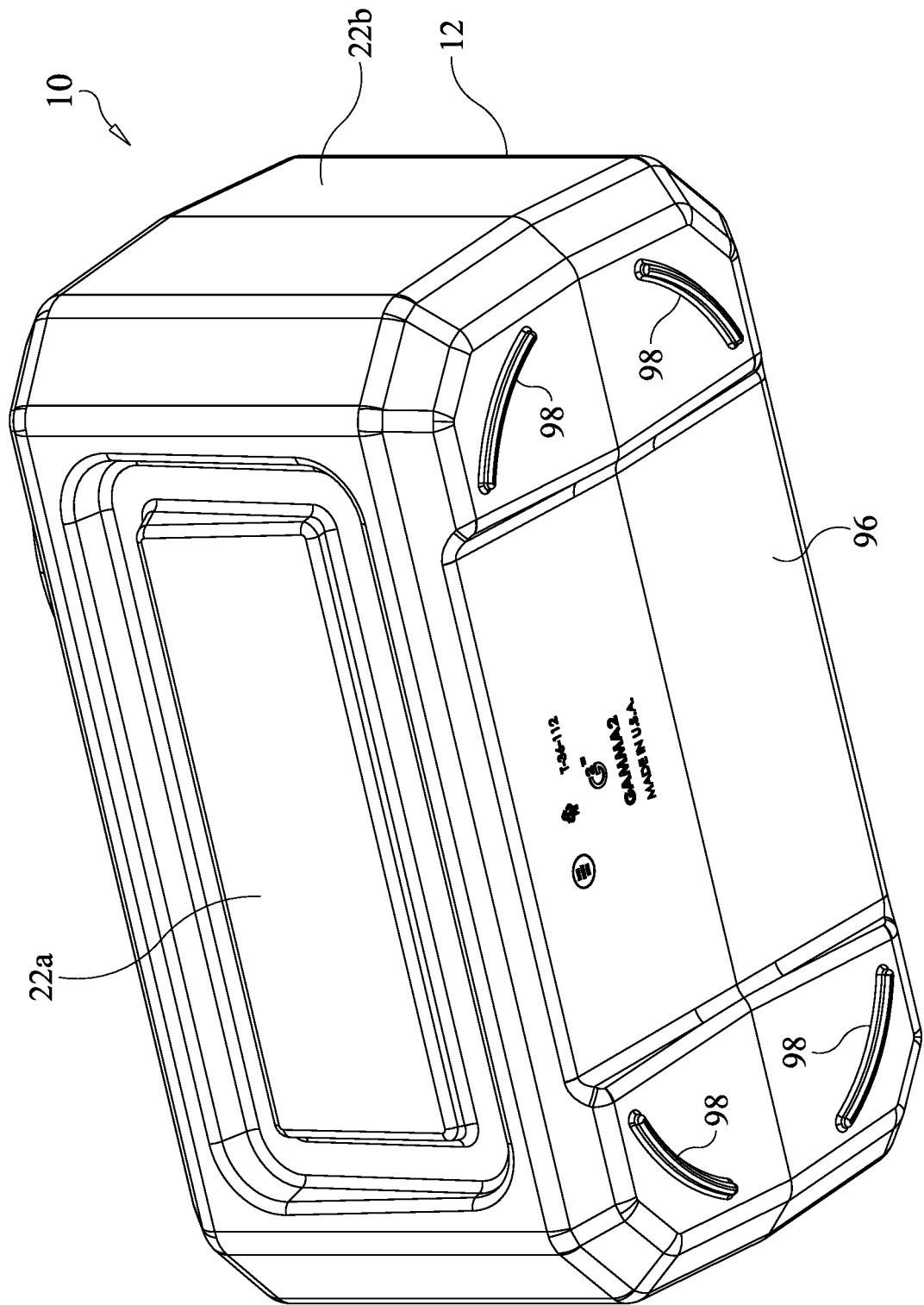
FIG. 8 is a bottom perspective view of the feeder shown in FIG. 1.
Figure 9:
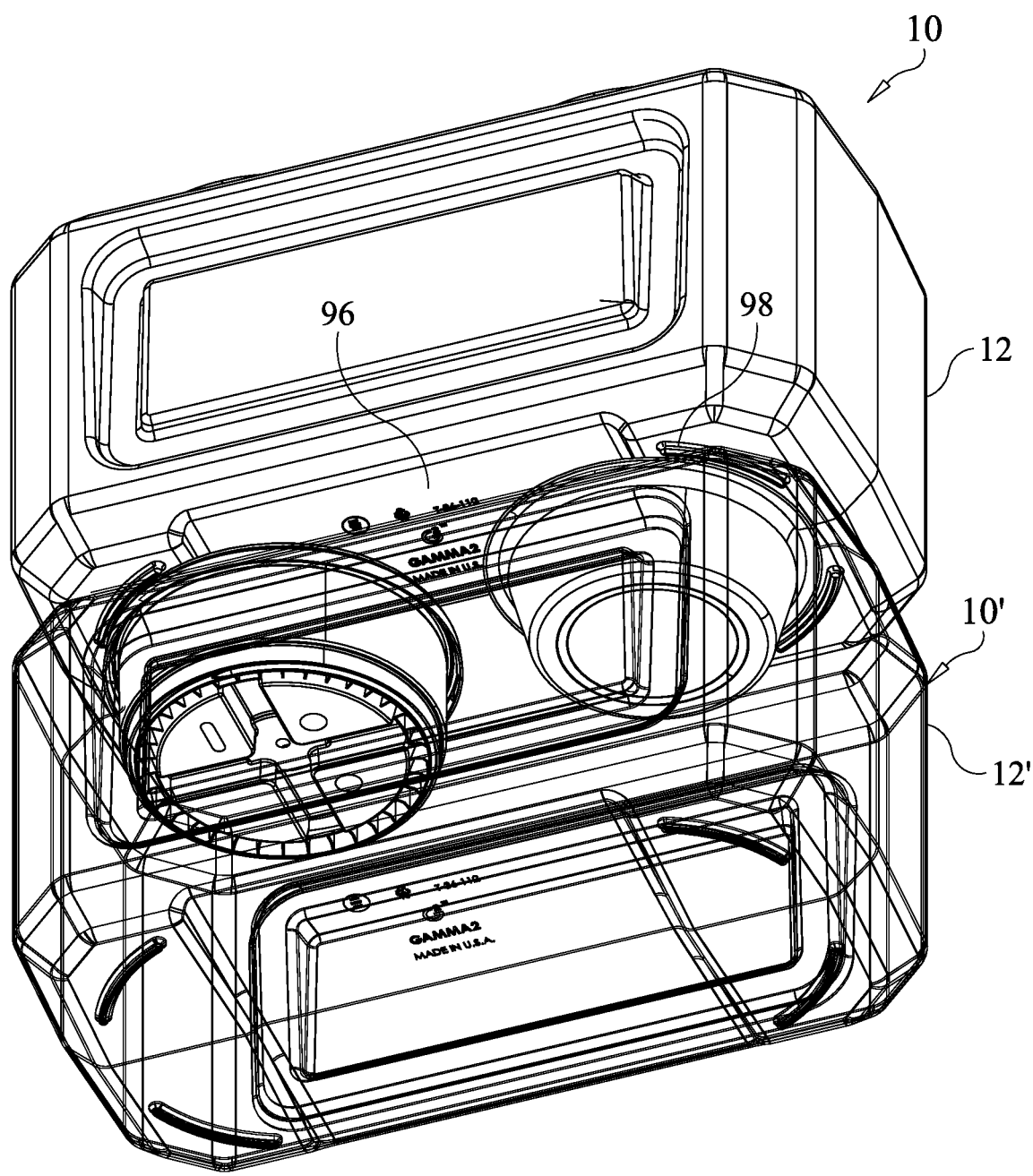
FIG. 9 illustrates a second feeder being stacked with the feeder shown in FIG. 1.

As shown in FIG. 8, the bottom surface 96 of the body portion 12 can include ribs 98 or feet. The ribs 98 elevate the feeder 10 off the ground to enable air to flow through. Additionally, as shown in FIG. 9, the ribs 98 are configured to fit within around the openings on the body portion 12' of another feeder 10' for stacking and shipping purposes. That is, as discussed above, the openings 24, 26 have upwardly extending protrusions 33, 34, and the ribs 98 can be arcuate, such that the ribs 98 are positioned around the upwardly extending protrusions on the body portion 12' of another feeder 10'. The ribs 98 can be formed so as to frictional fit around the upwardly extending protrusions to securely couple the feeders together. In one embodiment the ribs 98 are padded or have scratch resistant materials or coatings thereon.

Figure 10:
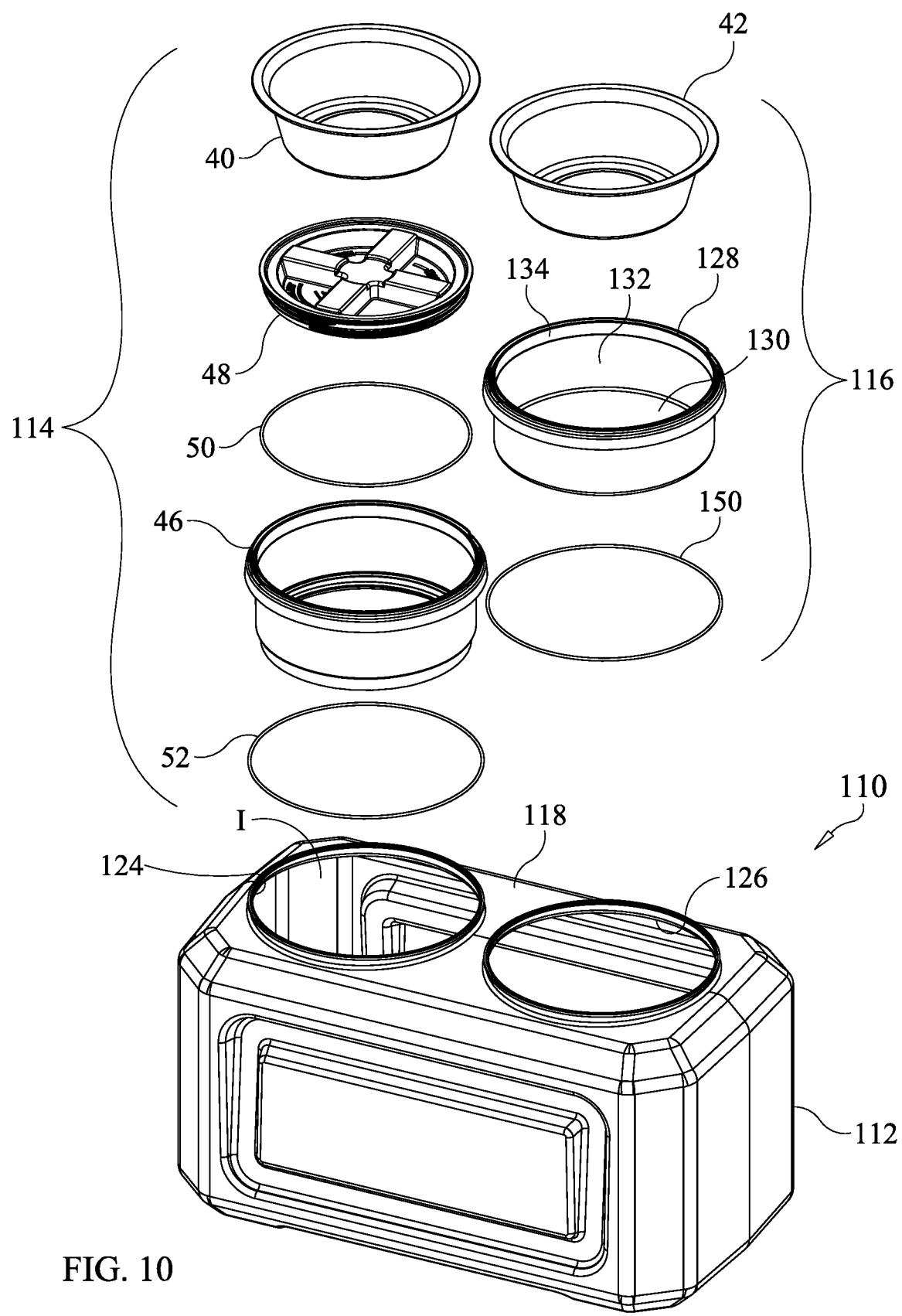
FIG. 10 illustrates a second embodiment of the present invention.

A second embodiment of a feeder 110 is illustrated in FIG. 10. In this embodiment, both the first bowl system 114 and the second bowl system 116 can be positioned within the first opening 124 and the second opening 126, respectively. The first bowl system 114 is identical to the first bowl system 14, and is it not necessary to further describe herein. The second bowl system 116 includes the bowl 42, a removable insert 128 and a sealing device 150. The removable insert 128 has the same general shape as recess 28. In other words, the removable insert 128 has a generally conical wall 132 that extends from the opening 126 (when inserted therein) at the top surface 118 of the body portion 112 into the internal storage compartment I. The conical wall 132 tapers radially inwardly relatively from the top portion 134 and connects to the bottom surface 130 to form a recess. The bowl 42 can be positioned within the recess. The removable insert 128 at a top portion 134 thereof has a similar structure as the top portion 54 of the sleeve 46. Thus, the top portion 134 of the removable insert 128 has the same snap fit as the top portion 54 of the sleeve 46 illustrated in FIGS. 6 and 7, and therefore, such a description is not repeated herein.

Furthermore, in this embodiment, the second bowl system 116 includes a sealing system that is comprised of the radial protrusion on the insert 128, a protrusion on adjacent the second opening 26 and the sealing device 50. Thus, similarly as shown in FIG. 7, the insert 128 can be snap-fit to the base portion 112 adjacent to the opening 126. As can be understood, the O-ring can be rubber or any other resilient compressible material that forms a seal between the insert 128 and the body portion 112.

Moreover, since the openings 124, 126 generally are similar the openings 124, 126 can each accept either the first bowl system 114 or the second bowl system bowl 116, such that the bowl systems 114, 116 can be interchangeably disposed in either opening 124, 126.

In another embodiment, the bowls 40, 42 can be injection molded and operate as the sleeve 46 and the insert 130. That is the sleeve 46 and the insert 130 can have an interior surface that is bowl shaped, making the stainless bowl inserts unnecessary.

In one embodiment, the bowls 40, 42 can attach to the sleeve 46 and the insert 130 if desired, using a snap-fit or other connection system. In other embodiment, the inserts can include a padded portion to cushion the bowl, or the bowl can include a lip that has a cushion on the underside. As can be understood, the bowls 40, 42 are disposed in openings (24, 124, 126) in the body portion (12, 112) that enable access to the storage compartment.

In one embodiment, the top surface 18 of the body portion 12 and thus the elevated bowls 40, 42 can be about 14 inches from the ground or any desired height. The body portion can be blow molded or injection molded.

The embodiments described herein enable an airtight seal for the storage compartment, controlled moisture balance, pest proof and keeps the food safe. Further, as shown and described herein, the embodiments of the present invention include a threaded locking system and reliable double gaskets. These features create a controlled moisture balance that lets the good moisture in and keeps the harmful moisture out. Embodiments also can control the moisture balance and pest protection. That is, embodiments of the present invention consistently lock the freshness and flavor in and prevents pests from entering. For example, the features of the present invention can stop ants and other pests from entering the feeder. Embodiments of the present invention include an integral seal ring and are BPA free. The embodiments are engineered with strength and durability and made with food-safe BPA free plastic.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A feeder comprising:
   a base portion defining an internal storage chamber and having at least one opening;

a tubular insert configured to be positioned within the opening and attachable to the base portion, the insert including a sealing system and defining a through passage, the sealing system configured to seal the internal storage chamber, the sealing system includes a first O-ring disposed at a top of the insert and a second O-ring disposed at a bottom of the insert;

a lid configured to attach to the insert so to prevent passage through the through passage; and a bowl configured to be disposed within the insert.

2. The feeder of claim 1, wherein
the base includes a lip with an upper surface surrounding the opening, the tubular insert includes an outer circumferential protrusion with a recess, and the second O-ring is configured to be disposed within the recess so as to abut the upper surface.

3. The feeder of claim 1, wherein
the first O-ring is configured to be disposed between a surface of the tubular insert and a surface of the base adjacent the opening in the base.

4. The feeder of claim 1, wherein
the second O-ring is configured to be disposed between a surface of the tubular insert and a surface of the lid.

5. The feeder of claim 1, wherein
the first O-ring is disposed between the insert and the base and the second O-ring is disposed between the insert and the lid.

6. The feeder of claim 1, wherein
the lid is attachable to the insert using threads.

7. The feeder of claim 1, wherein
the lid is attachable to the insert so as to define a receptable for the bowl.

8. The feeder of claim 1, wherein
the at least one opening in the base portion includes a first opening and a second opening, and the tubular insert is configured to be positioned within the first opening.

9. The feeder of claim 1, wherein
the tubular insert is configured to snap fit to the base.

10. The feeder of claim 1, wherein
a bottom includes protrusions sized and configured to surround the opening in the base of another feeder.

11. A feeder comprising:

a base portion defining an internal storage chamber and having a first opening and a second opening;

a tubular insert configured to be positioned within the first opening and attachable to the base portion, the first tubular insert defining a through passage;

a sealing system configured to be disposed between a surface of the first tubular insert and a surface of the base adjacent the first opening in the base to seal the internal storage chamber, the sealing system includes a first O-ring disposed at a top of the tubular insert and a second O-ring disposed at a bottom of the tubular insert;

a lid configured to attach to the first tubular insert so to prevent passage through the through passage;

a first bowl configured to be disposed within the tubular insert; and a second bowl configured to be disposed within the second opening in the base to seal the internal storage chamber.

12. The feeder of claim 11, wherein
the tubular insert is configured to snap fit to the base.

13. The feeder of claim 11, wherein
the first O-ring is disposed between the tubular insert and the base and the second O-ring is disposed between the tubular insert and the lid.

* * * * *